INVENTOR.
Albert H. Bell III
BY
Harness & Harris
ATTORNEYS.

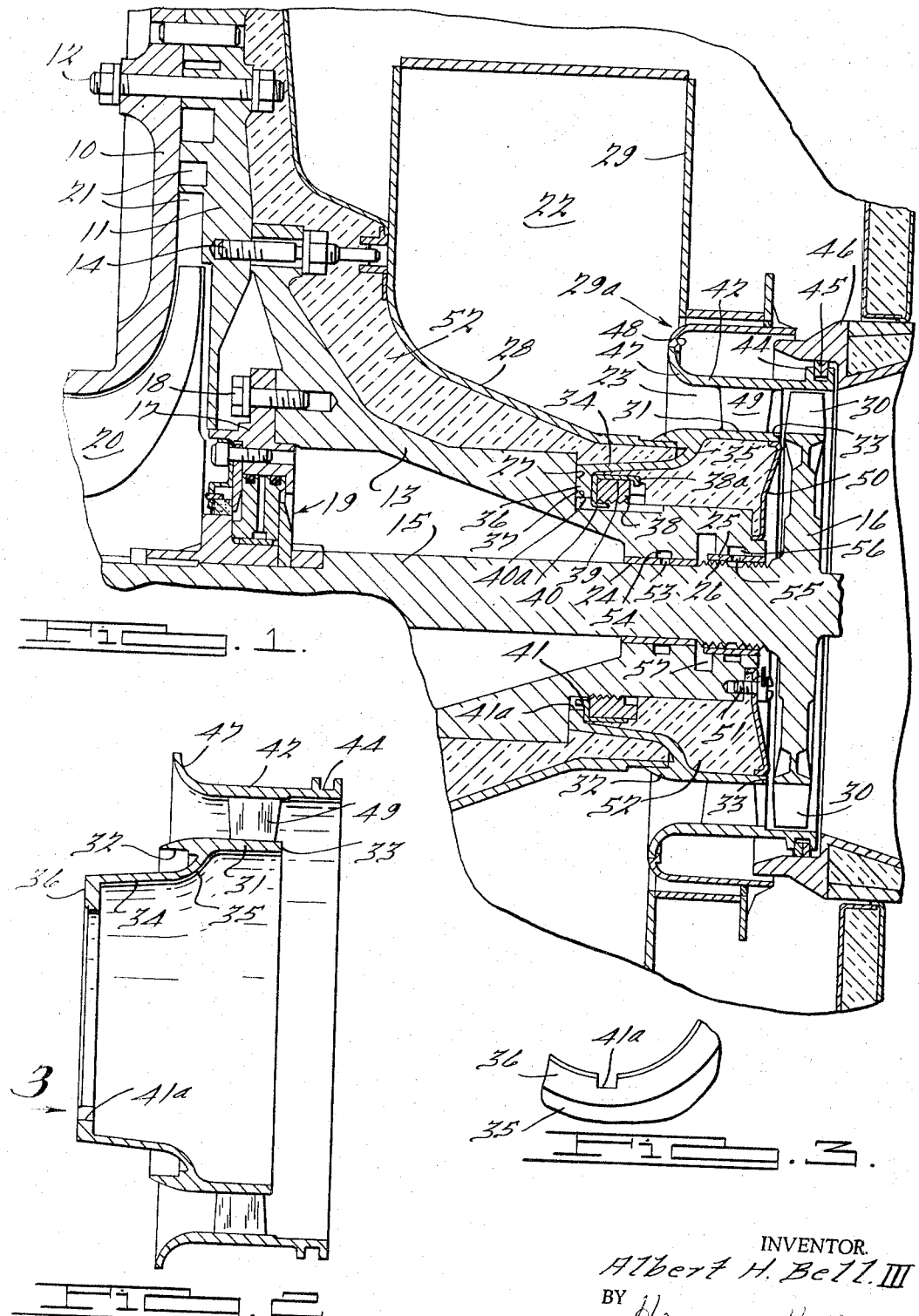

United States Patent Office 3,314,653
Patented Apr. 18, 1967

3,314,653
UNITARY NOZZLES AND SHROUD SECTIONS
Albert H. Bell III, Birmingham, Mich., assignor to Chrysler Corporation, Highland Park, Mich., a corporation of Delaware
Filed Apr. 10, 1964, Ser. No. 358,723
14 Claims. (Cl. 253—78)

This invention relates to improved means for directing the hot motive gases against the blades of the first stage rotor of an automotive gas turbine engine.

Although application of the present invention is not limited to use with first stage nozzle blades and may be used with any turbine stage where the thermal and structural environments give rise to similar problems, the first stage nozzle blades of an automotive gas turbine engine encounter unique problems because of the great and rapid operational temperature extremes to which the nozzle blades and their associated structures are subjected in order to achieve acceptable acceleration, and because of the extreme precision required in the alignment and dimensional relationship of the fixed nozzle blades with respect to the associated rotor blades in order to match the effective cross sectional areas available at these blades for conducting the flow of motive gases to achieve optimum power therefrom when the gas flow approximates the speed of sound, i.e., trans-sonic velocity.

As is well known in the art, turbine engines are comprised of a gas generator section consisting primarily of an air compressor, a burner, and a first stage or compressor turbine wheel or rotor which obtains its energy from the hot motive gases flowing out of the burner and drives the compressor. Some turbine engines, depending on their intended use, also include a second stage or power turbine which when placed in the path of the flowing gases downstream of the compressor turbine serves to provide additional work.

In one type of automotive gas turbine engine, the hot motive gases are conducted from the burner to a spiral collecting chamber and thence to the peripheral blades of the first stage rotor by an annular gas passage comprising inner and outer annular shroud sections spaced by a plurality of fixed nozzles or blades immediately upstream of the rotor blades. In order to minimize by-passing of the rotor by the motive gases, it is important to maintain the inner periphery of the annular outer shroud section as close as possible to the outer periphery scribed by the rotor blades, while maintaining operating clearance therewith as the rotor and juxtaposed shroud portions expand or contract with changing temperature conditions.

In consequence of the extreme temperature range of the motive gases between idling and maximum power output conditions of the engine, difficulty has been experienced in matching the expansion of the shroud sections and fixed nozzle assembly with the expansion of the rotor so as to maintain a predetermined spacing between the rotor and outer shroud section and between the inner and outer shroud sections at the region of the nozzles. If the nozzles and their supporting structure are caused to expand at a greater rate or to contract at a lesser rate than the corresponding expansion or contraction of the outer shroud section, the nozzles will be severely compressed against the outer shroud section, resulting in damage to the nozzles or outer shroud section either by buckling of the nozzles or by embedding the latter into the material of the outer shroud section. When the operating temperature conditions change to relieve the compression force on the nozzle, a loose support for the outer shroud section will result and the latter will rub against or bind the peripheral blades of the rotor.

In order to provide the necessary clearance between the rotor and the immediately surrounding portion of the outer shroud, the latter has been provided heretofore as a unit separate and distinct from the nozzles so as to be comparatively free from distorting stresses transmitted through the nozzles. In such structures, the clearance between the outer shroud and rotor blades had to be comparatively large, with consequent loss in efficiency, to accommodate the unavoidable thermal and pressure induced distortion of the parts involved.

As an additional consideration, the ultimate output power developed by any turbine engine is primarily dependent on the output of the gas generator section which, in turn, is a function of the compressor speed of that particular gas generator. In many instances it has been found that substantial variations in output horsepower exist as between any two turbine engines even though the turbine engines are of the same design and rated output power. Such variations, which in some cases have been in the magnitude of thirty percent (30%) power loss, exhibit themselves to the greatest extent in the range of compressor speeds of seventy-five percent (75%) to a hundred percent (100%) of the designed or rated maximum compressor speed. Further, these variations occur most frequently in turbine engines, such as for automotive vehicles, wherein the gas flow through the fixed guide vanes or nozzles and compressor turbine wheel blades closely approaches sonic velocity as the compressor speed approaches its designed maximum speed.

As a consequence of such power variations, it becomes impossible to predict with reasonable accuracy the expected power output of any particular turbine engine. It has been discovered that if certain relationships between the elements comprising the turbine engine are considered as being critical and such relationships are established during the process of manufacturing the turbine engine and maintained during operation of the engine, a reasonably predictable output horsepower can be produced which is consistently at an optimum efficient value.

A significant aspect of the present invention has been the discovery that in order to maintain the efficiency of an automotive gas turbine engine at motive gas speeds approximately the speed of sound, a precise dimensional and spatial relationship must be maintained between the rotor blades and the assembly comprising the nozzle blades and the juxtaposed portions of the inner and outer shrouds. Specifically it has been found that the critical relationship that must be achieved and maintained during operation exist in the geometry and effective cross sectional area of the flow passage for the motive gases immediately in advance of the nozzles as well as at the nozzles themselves.

Accordingly, a general object of this invention is to provide, in an automotive turbine engine, fixed guide vanes or nozzles and cooperating flow passage means and compressor turbine wheel blades having a relationship established therebetween which enables the turbine engine to exhibit an overall higher efficiency and to achieve a predicted output horsepower which is within a reasonable range of tolerances.

Another object is to provide improvements in an automotive gas turbine engine having a bladed rotor and inner and outer annular shroud sections defining an annular passage for conducting hot motive gases to the peripheral blades of the rotor, the shroud sections being spaced by a plurality of fixed flow directing nozzles arranged annularly within the passage adjacent and in advance of the rotor blades. A support for the fixed nozzles comprises an annular flange extending from one of the shroud sections. The support, inner and outer shroud sections, and nozzles comprise a one-piece cast assembly wherein the shroud sections extend upstream from the leading edges of the nozzles and join with the walls of the spiral collecting chamber at a distance from said leading edges whereat the meridional velocity of the gas flow is less than .7 of the meridional velocity at said leading edges, the shroud sections also providing aerodynamically smooth continuous walls of an annular gas flow passage throughout that distance; wherein the cross sectional thickness of each element in the assembly is of the same order of magnitude to assure uniform thermal expansion and contraction of all parts of the assembly; and wherein the cross sectional area of the annular gas flow passage progressively decreases from the collecting chamber to the leading edges of the nozzles such that the static gas pressure progressively decreases in the downstream direction throughout the extent of the shroud sections in advance of the nozzles.

By virtue of the unitary assembly of the inner and outer shroud sections spaced by the annularly arranged nozzles as described, a rugged self reinforced and geometrically stable assembly is achieved which enables the tolerance in the spacing between the outer shroud section and rotor blades to be materially reduced. This factor in cooperation with the shroud sections extending toward the spiral collecting chamber as described, so that the discontinuity between the collecting chamber and the annular gas passage leading directly to the nozzles is located axially upstream of the nozzles a distance determined by the meridional velocity as stated above, enables the gas flow to the nozzles to be matched with the gas flow to the first stage rotor blades. Consistent predictability of engine performance in mass production is thus achieved.

It has been found that where the discontinuity is located in the region of the gas flow having a component of meridional velocity greater than .7 of the maximum meridional component of velocity at the leading edges of the nozzles, the predictability of the engine performance is unreasonably inexact. On the other hand when the same discontinuity is located upstream of the nozzles at the region whereat the meridional component of the velocity of the gas flow is less than the .7 value, the efficiency and output of the engine can be predicted within an acceptable range of tolerance. Of course, the slower the meridional gas flow at the region of the discontinuity, the more accurately can the engine performance be predicted.

It is accordingly another object of the present invention to provide an assembly of the first stage nozzles, inner and outer shroud sections, and a support therefor in combination with a spiral collecting chamber wherein the discontinuity between the shroud sections and collecting chamber is located in the region of the gas flow upstream of the nozzles whereat the meridional velocity component is less than .7 of the maximum meridional velocity at the upstream edges of the nozzles.

In the above regard the meridional velocity or gas flow is defined as the component of flow or velocity which carries the gases through the fixed nozzle blades, i.e. the radial and axial components of the gas flow or velocity, in contrast to the tangential component of the gas flow or velocity which drives the turbine rotor. Also in regard to the assembly of the nozzles, inner and outer shroud sections, and support, this assembly is preferably a unitary casting where the geometry of the assembly permits. Thus the necessity of precision interfitting of the components is avoided, without which, objectionable discontinuities in the air flow passage would result. However, where a unitary casting is not feasible, a precise interfitting of the components of the nozzles, shroud sections, and support assembly can be feasibly accomplished.

Also in the above regard, it is to be emphasized that it is not the discontinuity per se that is objectionable, because suitable compensation and allowance can be made for any known structural requirement of the engine. The overall engine performance or output can then be predetermined accordingly. The objection involving the discontinuity is the fact that the effect of the discontinuity on engine performance can not be predicted within a reasonable range of accuracy unless the discontinuity is located as described above.

Other objects of this invention will appear in the following description and appended claims, reference being had to the accompanying drawings forming a part of this specification wherein like reference characters designate corresponding parts in the several views.

FIGURE 1 is a fragmentary mid-sectional view through the rotors of a gas turbine engine embodying the present invention.

FIGURE 2 is an enlarged mid-sectional view through the nozzle support.

FIGURE 3 is a fragmentary elevational view taken in the direction of the arrow 3 of FIGURE 2.

Figure 4:
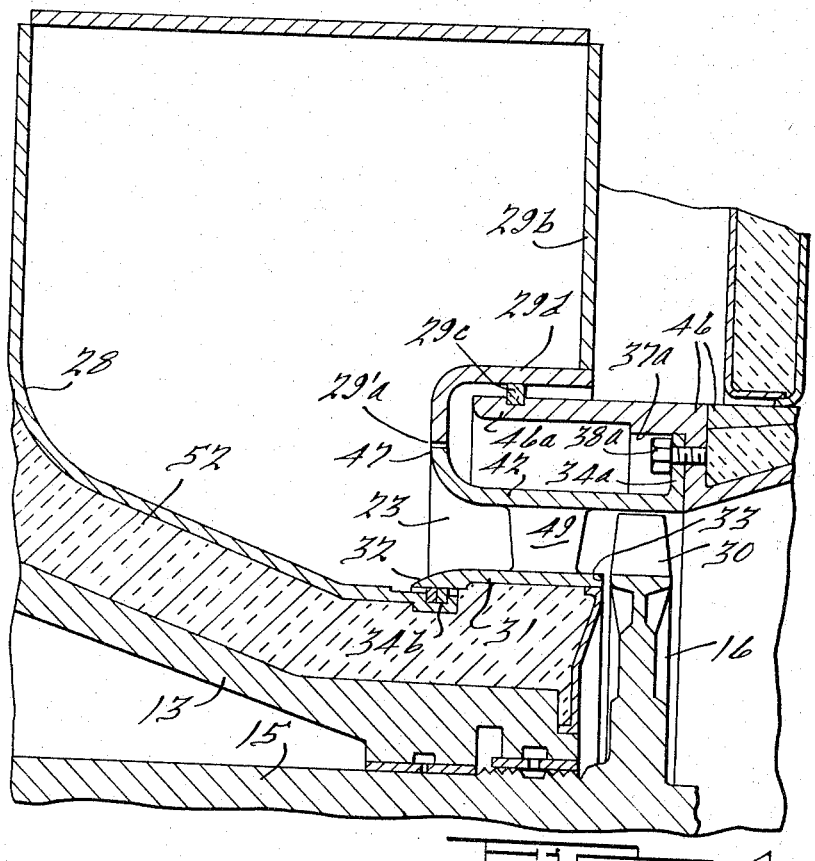
FIGURE 4 is a view similar to FIGURE 1, showing a modification.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring in more particularity to the drawings, portions of an automotive gas turbine engine embodying the present invention are illustrated including a fixed frame member 10 of the engine's compressor-diffuser assembly. A compressor-diffuser wall 11, which may comprise an aluminum alloy casting, is suitably mounted on the frame member 10 by bolts 12. A central annular hub 13 is secured to the casting 11 by bolts 14 and provides support for the shaft 15 of a first stage turbine rotor 16. An annular bushing support 17 secured to hub 13 by bolts 18 carries a bushing assembly 19 for shaft 15 at a location adjacent the blades 20 of a radially discharging air compressor. The blades 20 discharge compressed air through a spiral diffuser 21 between the walls 10 and 11 to a regenerator, not shown, which preheats the compressed air and discharges the preheated air to a burner. In the burner, fuel is added and burned whereupon the hot combustion gases are discharged into a spiral collecting chamber 22 and thence into an annular gas passage 23. A second annular bearing support portion of hub 13 encloses a ported bushing 24 and sleeve 25 for a labyrinth seal 26 to support these elements. An annular pilot flange 27 to be described in more detail below extends radially in the outer surface of hub 13 adjacent the bearing 24.

The left end of the shaft 13 is suitably keyed to a compressor hub which carries the blades 20 to supply the high pressure combustion supporting air that is eventually discharged from the combustion chamber into the spiral collecting chamber 22. The latter is defined in part by an annular sheet metal inner wall 28 which extends coaxially around and shields the hub 13 and bearing 24 from the hot motive gases in chamber 22.

The spiral chamber 22 is completed by an outer wall 29 formed by sheet metal parts welded together. The right inner edge of wall 29 terminates in an annular sealing assembly 29a which is secured to an outwardly flared wall element of passage 23 as described below. The latter conveys the hot motive gases from the collecting chamber 22 axially of the rotor 16 to the latter's peripheral blades 30 and thence to a second stage rotor which may be connected by speed reducing gears to the driving wheels of the vehicle.

The passage 23 is formed of a pair of annular inner and outer shroud sections including an inner shroud section 31 having its left hand edge 32 closely overlapping the right hand annular edge of the wall 28 in sliding relationship and having its right edge 33 arranged in juxtaposition with the rotor 16 at the base of the blades 30.

The inner shroud 31 is supported by means of a tubular and slightly conical body 34 having a rounded outwardly flared end flange 35 joined with the inner shroud 31 at a location immediately adjacent the right edge of wall 28, FIGURE 1. The opposite or inner end of tubular support 34 terminates at a radial inturned annular flange 36 which seats firmly against the pilot shoulder 27 of hub 13. The inner circumference of flange 36 seats on a cylindrical pilot portion 37 of hub 13 at the base of shoulder 27. The flange 36 is maintained in alignment with respect to pilot portions 27 and 37 and in heat conducting contact therewith by means of a nut 38 screwed on an outer threaded portion of hub 13 tightly against flange 36. A suitable lock washer 39 interposed between nut 38 and flange 36 is provided with tabs 40 and 41 bent into mating notches 40a and 41a in hub 13 and flange 36 respectively and is also provided with an inbent tab 38a deformed into a mating notch in the nut 38, thereby to interlock the nut 38, hub 13 and flange 36 securely together in predetermined alignment.

The outer annular shroud section 42 extends coaxially around shroud section 31 and closely overlies the outer peripheries of the rotor blades 30 so as to provide operational clearance therewith. An outwardly opening sealing groove 44, which contains an annular seal 45 engaging the inner annular surface of the nozzle block 46 in sealing relation is formed in its outer surface adjacent its right edge, FIGURE 1. The left or upstream end of shroud 42 is flared outwardly at 47 and interfits with an annular offset inner edge 48 of the seal 29a. The shroud sections 31 and 42 are spaced by a plurality of integral fixed nozzles or blades 49 spaced circumferentially around the rotor axis immediately upstream of the rotor blades 30 for directing the motive gases thereto. The juncture between the flange 34 and shroud 31 is as close to sleeve end 32 and as remote from the nozzles 49 as feasible so as to avoid influencing the temperature of the nozzles 49 by thermal inertia.

In accordance with the structure described, the inner and outer shrouds 31 and 42, together with the blades 49 and support 34, are cast as an integral unitary annular assembly. Accordingly the inherent rigidity of the annular shroud sections 31 and 42 and interconnecting blades 49 tend to resist conical deformation resulting from thermally induced force applied at the juncture between the integral support flange 35 and the inner shroud section 31. This force is further reduced by virtue of the tubular support 34 which readily expands axially in accordance with the temperature gradient therealong without subjecting the shroud 31 to radial forces. By suitably determining the length of the support 34, its axial temperature gradient can be predetermined during operation so as to control the temperate of flange 35 and to maintain the latter at a temperature comparable to the temperature of hub 13 which in the region of the bearing 24 is suitably cooled by lubrication and a coolant air flow.

An annular shield or plate 50 is secured to the right end of hub 13 by bolts 51 to close the annular space between the hub and the right edge 33 of inner shroud 31. This space, bounded by hub 13, plate 50, and the integral shroud 31, support 34 and flange 36, is packed with a suitable thermal insulation 52. Similar insulation is packed between the hub 13 and wall 28 of the collecting chamber 22.

A coolant such as a lubricating fluid is pumped under pressure from an engine driven pump into annular groove 54 and thence through ports 53 to the surface of shaft 15 to be lubricated. Similarly, cooling air supplied as for example from the air compressor 20 to annular groove 56 is discharged through ports 55 in sleeve 25 to the labyrinth seal 26 from whence it flows axially by leakage into the fluid return duct 57 which returns the coolant fluids to a sump, or radially between shield 50 and rotor 16 into the high velocity axial flow of motive gases in passage 23.

In order to attain efficient operation of the engine, it is essential to maintain the minimum clearance between the blades 30 and outer shroud 42 required to prevent binding between these parts. The assembly illustrated in FIGURE 2 is formed from comparatively low expansion metal so that the shrouds 31, 42 and nozzles 49 will match the radial thermal expansion of rotor 16. The latter on the other hand has the comparatively cool central shaft 15 which restrains radial expansion of its hotter outer periphery exposed to the hot motive gases. Its outer periphery thus tends to expand less than would similarly heated portions having no appreciable radial thermal gradient, as for example the outer annular flange 35 of nozzle support 34. The present construction reduces the thermal expansion of support flange 35 by virtue of the tubular body or support 34 arranged coaxially with rotor 16 to conduct heat axially from the flange 35 to maintain the latter's temperature at a reduced level with respect to the temperature of the shroud sections 31 and 42. In consequence, the radial thermal expansion and contraction of end 35 can be readily matched with the corresponding expansion and contraction of the outer periphery of the rotor 16 by suitably predetermining the length and wall thickness of the tubular body 34.

As the flow of motive gases in conduit 23 approaches the speed of sound, i.e. sonic velocity, the dimensional relationship between the fixed nozzles 49 and rotor blades 30 must be precisely maintained in order to prevent a marked drop in operating efficiency. Not only must the hot outer end flange 35 expand and contract with the outer rim of the rotor 16 which supports the blades 30, but the angular relationship of the shroud sections 31 and 42, as for example with respect to the axis of rotation, must be maintained substantially constant with respect to the corresponding angular relationship of the aforesaid rim of rotor 16. In addition to the considerations described above, such relationships are dependent upon the stability of the piloted seating of flange 36 against the radial pilot shoulder of bearing hub 13.

It is apparent that the less the temperature differential between the pilot flange 36 and the mating pilot shoulder of the bearing hub 13, the more stable will be the flange 36 seated at the pilot shoulder. In other words, the more the pilot flange 36 is cooled toward the temperature of the mating pilot shoulder 27, the less will be the thermal distortion of the flange 36 on the hub 13, the less likely will the flange become loose or lose its piloted seating on hub 13 and the more positively will the support 34 and shroud sections 31 and 42 be supported. In addition, the less the temperature gradient along the conical nozzle support body 34, the less will be the thermally induced stresses at flanges 36 and 35 resulting from changes in the conical angle of support 34, i.e. the angle between the support 34 and the axis of rotor 16, and the less will be the force tending to bend the flanges 36 and 35 out of their angular positions shown.

It is apparent that the requirements to maintain flange 36 cool and to maintain a suitable shallow axial temperature gradient in support 34 are both served by increasing the axial length of support 34. For example, the longer the support 34, the greater will be its resistance to heat flow axially from the hot flange or end 35 toward the cooler flange 36 and the cooler will be the latter flange, all other conditions being equal. Also for any given increment of radial expansion of flange 35 with respect to the radial expansion of flange 36, the less will be the change in the conical angle of support 34. For these reasons, the axial length of support 34 is as long as feasible and at a minimum is sufficiently long to restrict the heat flow therein toward flange 36, so that the temperature of the latter will be maintained at approximately the temperature of the adjacent pilot shoulder 27 of the hub 13 during operation of the engine at maximum load. Conversely, the shorter the axial length for support 34, the greater must be the strength at the junctures between the support 34 and the flanges 35 and 36. For an automotive engine which necessarily employs a rotor 16 of as small a diameter as possible and wherein the operating temperature at flanges 27 and 35 are of the magnitudes of 600° F. and 1200–1500° F. respectively, the ratio of the axial length of support 34 to the radial distance between the inner diameter of the shroud section 31 and the outer diameter of flange 36 will preferably exceed 2:1, whereas a ratio of 1:1 is impractical with materials presently available at competitive prices.

It is apparent that the radial thickness and axial length of the body 34 can be determined for suitably conducting of heat from the flange 35 and to establish any desired axial temperature gradient along the length of the body 34. In addition, the integral flange 36 is maintained in heat exchange or transfer relationship with the comparatively cool hub 12 in order to conduct heat thereto. By virtue of the structure described, the inner periphery of the flange 35 is not directly connected with the comparatively cool bearing hub 13, but is connected thereto by means of the tubular body 34 and flange 36. Accordingly, the radial temperature gradient in flange 35 is comparatively small and the latter is free to expand and contract substantially as an annulus of uniform temperature without suffering permanent deformation.

In order to predetermine the air flow in the annular gas passage 23 defined by the shroud sections 31 and 42, it is essential that the static pressure of the gases progressively decreases in a predetermined manner from the mouth of the opening 23, i.e. at the leftward ends of shroud extensions 32 and 47, to the upstream edges of the blades 49. The desired negative pressure gradient is obtained by progressively decreasing the cross sectional area of the passage 23 in the direction of flow, either by decreasing the effective radius of the annular passage 23, or by converging the shroud sections 31 and 42 toward each other in the direction of flow, or by a combination of these factors.

The curvature of the flared shroud portion 47 is calculated in accordance with well known aerodynamic principles so as to avoid turbulence in the gas flow resulting from centrifugal or other effects such as discontinuities in the smoothness of the curvature. For the sake of compactness in the automotive turbine engine, as well as to simplify casting of the shroud and nozzle assembly of FIGURES 2 and 5, the extension 47 is caused to flare in the upstream direction as rapidly as is aerodynamically feasible. Thus the extension 47 begins to diverge from the axis of the annular gas passage 23 immediately as it departs from the upstream or leading edges of the nozzles 49, the limit of flaring being of course achieved when the extension 47 is at right angles to the rotor axis which is coaxial with annular passage 23.

The curvature of extension 47 is a function of the radial height of the blades 49, i.e., the radial spacing between the shrouds 31 and 42 at the region of the blades 49, and in the present instance where the flaring of shroud section 31 toward end 32 is limited by the minimum possible radius of collecting chamber 22, the leftward end of extension 47 is spaced axially from the leading edges of the nozzles 49 a distance greater than the aforesaid radial nozzle height.

It is apparent that the leftward edge of extension 47 where the tangent thereto is perpendicular to the rotor axis, the speed of the gas flowing into passage 23 is comparatively small with respect to the trans-sonic speed of the gas flow at the region of the nozzles 49. Accordingly any small discontinuity in the surface of the gas passage, as for example at the seal 29a joining the left end of extension 47 and the sidewall 29, will have no appreciable effect on th efficiency of the engine. However, the further any turbulence or sidewall discontinuity is located downstream of the leftward edge of extension 47, the more objectionable it becomes, particularly in its effectiveness in rendering unpredictable the engine power output. Imperceptible or uncontrollable variations from one engine to another in any discontinuity in the sidewalls of passage 23 upstream of nozzles 49 at locations closer thereto than the region whereat the meridional velocity of the gas flow exceeds .7 of the maximum meridional velocity at the upstream edges of the nozzles 49 will cause such unpredictable changes in the engine efficiency that mass production of the engine within a reasonable performance range is rendered impossible.

In the above regard, it is to be noted that it is the major variations in performance from engine to engine caused by imperceptible or uncontrollable variations in the discontinuity, rather than the discontinuity itself, that has rendered impossible the production of engines with consistently predictable performance. Heretofore it has not been suspected that minor or secondary variations in the size of a discontinuity located as explained above would have such a marked effect on engine efficiency that engines of otherwise identical constructions would vary as much as or more than 30% in power output.

In the ideal situation, the shroud sections 31 and 42 upstream of the nozzles 49 would flare outwardly as rapidly as would be aerodynamically feasible. The juncture between the shroud sections and the sidewalls of collecting chamber 22 would then be in the region whereat the shroud sections 31 and 42 extend perpendicularly to the rotor axis. Because of the aforesaid limitation on the curvature of shroud section 31, the latter extends axially in the present instance approximately as far as extension 47 in order to achieve predictability of engine efficiency within a reasonable degree of accuracy.

In regard to thermally induced changes in the convergence of the gas flow within annular passage 23 upstream of the nozzles 49 resulting from changes in the effective radius of the passage 23, these changes have resulted heretofore in consequence of the lack of stability in the nozzle and shroud assembly influenced by thermally induced changes on the conical angle of the shroud sections with respect to the rotor axis. The present construction avoids such difficulties by casting all of the elements 31, 34, 42 and 49 to the same order of cross sectional thickness and by providing the nozzles 49 as integral components of the shroud sections 31 and 42, whereby the mutually reinforcing components cooperate to effect a rugged and geometrically stable assembly. Thus thermal inertial effects and temporary distortions and even rupturing of the parts resulting from localized overheating are avoided. In particular, the blades 49 maintain the shroud sections 31 and 42 in predetermined angular relationship with the rotor axis, whereas the shroud sections 31 and 42 support the nozzles 49 against deformation and protect the extremely thin trailing edges of the nozzles 49 which cannot withstand appreciable stress.

With reference to the nozzles 49, shroud sections 31, 42 and support 34 (particularly adjacent the shroud section 31) being all of the same order of magnitude of cross sectional thickness, it is meant herein that these elements are sufficiently similar in thickness, or are otherwise sufficiently compatible thermally if constructed of different materials, that they will all heat and cool and therefore expand and contract at approximately the same rate. These elements can withstand considerable strain and need not be of identical thickness, thus in one unitary cast construction, the shroud sections 31 and 42 are approximately sixty thousandths of an inch thick, whereas the maximum thickness of the nozzles 49 is approximately eighty thousandths of an inch, the nozzles tapering to approximately fifteen thousandths of an inch at their trailing edges. On the other hand, a shroud at the region of the nozzles 49 amounting to approximately five times the maximum thickness of the nozzles has caused the nozzles 49 to crack loose from the thicker shroud section. Heretofore the cause of such cracking was unsuspected and was attributed to lack of reinforcement and an insufficiently thick shroud section, or to casting flaws or errors in casting technique.

Figure 5:
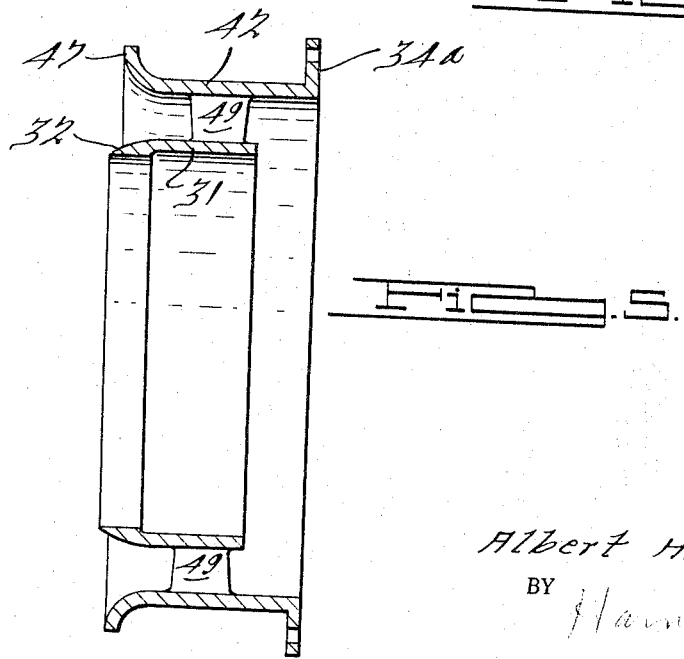
FIGURE 5 is an enlarged mid-sectional view through the nozzle support illustrated in FIGURE 4.

Although the conical support 34 affords the preferred connection between the hot shroud 31 and cool bearing support 13, as explained more fully in my copending application Ser. No. 358,868 filed the same date as this application, the advantages of the present invention are not limited to such a support 34. In fact certain advantages are achieved by eliminating the support 34, so as to facilitate maintenance of the assembly of the shroud sections 31, 42 and nozzles 49 at a uniform temperature. FIGURES 4 and 5 illustrate a construction similar in concept and structure to that of FIGURES 1–3, so that corresponding parts are numbered the same in all views.

In FIGURES 4 and 5, wall 29 is moved to 29b and seal 92c is provided between an annular extension 29d of wall 29b and an extension 46a of nozzle block 46. Also, instead of support 34, an annular flange 34a of approximately the same cross sectional thickness as shroud section 42 and cast integrally therewith extends radially outward from the latter's downstream edge and is secured by a plurality of annularly arranged bolts 38a to nozzle block 46. The upstream shroud end 32 is in sliding contact with seal 34b carried by wall 28 of chamber 22 to prevent leakage from passage 23, which is otherwise prevented in FIGURES 1–3 by support 34. The upstream shroud end 47 terminates at 29'a in proximity to the end of extension 29d, but is spaced slightly therefrom to allow for adjustment. The slight discontinuities at the leading edge of end 32 and at gap 29'a causes no appreciable difficulty because these are located in the comparatively slow region of the motive gas flow wherein the meridional velocity of the gas flow is appreciably less than .7 of the meridional velocity at the leading edges of the nozzles 49.

The nozzle-shroud support assembly is maintained in proper alignment with respect to nozzle block 46 by means of an annular pilot seat 37a of extension 46a coaxial with the rotor axis. The support 34a is piloted or seated on the pilot seat 37a. The materials of the nozzle block 46 and shroud-nozzle-support assembly secured thereto by the bolts 38a are either identical or are thermally compatible so as to expand and contract at the same rate to assure maintenance of the desired alignment of the shroud sections 31 and 42 and nozzles 49 with respect to the rotor blades 30. The slight sidewall discontinuity in the passage 23 at the juncture between shroud section 42 and nozzle block 46 does not appreciably affect the predictability of engine performance because the latter discontinuity is downstream of the rotor blades 30. For this reason the support flange 34a extends radially from the downstream edge of shroud section 42 which overlaps the rotor blades 30.

I claim:

1. In a gas turbine engine, a bladed rotor, a rotor shaft secured coaxially to said rotor, bearing means having said shaft journaled therein adjacent said rotor, a bearing support for said bearing means and having annular pilot means arranged coaxially with said rotor adjacent said bearing means and shaft, a one-piece assembly for directing motive gases to the blades of said rotor including inner and outer annular shrouds defining an annular gas passage coaxial with said rotor, a plurality of flow directing nozzles spaced circumferentially within said passage and having radially inner and outer ends integral with said inner and outer shrouds respectively to support the same, and axially extending supporting means arranged annularly around the axis of said rotor at a location radially inwardly of said inner shroud for supporting said shrouds and nozzles in predetermined alignment with respect to said blades, said supporting means being integral at one axial end with said inner shroud and having an integral annular pilot means at its other axial end seated against the first named pilot means in heat conducting and in predetermined spatial relationship therewith, means securing both pilot means together in said relationship, means cooperable with said inner shroud for shielding said bearing support and supporting means from said hot motive gases to maintain said bearing support comparatively cool with respect to said motive gases, the axial length of said supporting means being determined to effect an axial temperature gradient therein sufficient to maintain the second named pilot means at approximately the temperature of said first named pilot means and to distribute the thermal stresses in said supporting means to enable thermal distortion of said inner and outer shroud and nozzles with said blades without disrupting said predetermined spatial relationship and alignment.

2. In the combination according to claim 1, the maximum cross sectional thickness of said shrouds and nozzles and of said supporting means in the region of its juncture with said inner shroud being of the same order of magnitude, and said annular gas passage having a portion extending upstream of the leading edges of said nozzles, the cross-sectional area of said portion enlarging upstream of said leading edges.

3. In the combination according to claim 2, the blades of said rotor extending radially from its outer periphery, said inner shroud terminating adjacent the radially inner ends of said blades, and said outer shroud extending axially closely around the peripheral edges of said blades.

4. In the combination according to claim 1, said supporting means comprising a tubular support extending approximately in parallelism with said axis for the major portion of its length, then curving radially outwardly to its juncture with said inner shroud.

5. In a gas turbine engine, a bladed rotor, a rotor shaft secured coaxially to said rotor, bearing means having said shaft journaled therein adjacent said rotor, a bearing support for said bearing means and having an annular pilot shoulder extending coaxially around the axis of said rotor adjacent said bearing means and shaft, a one-piece assembly for directing motive gases to the blades of said rotor including inner and outer annular shrouds defining an annular gas passage coaxial with said rotor, a plurality of flow directing nozzles spaced circumferentially within said passage and having radially inner and outer ends integral with said inner and outer shrouds respectively to support the same, and axially extending supporting means arranged annularly around the axis of said rotor within said inner shroud for supporting said shrouds and nozzles in predetermined alignment with respect to said blades, said supporting means comprising a tubular support integral at one axial end with said inner shroud and having an integral annular pilot flange at its other axial end seated against said shoulder around said axis in heat conducting and in predetermined spatial relationship therewith, means securing said pilot shoulder and flange together in said relationship, means cooperable with said inner shroud for shielding said bearing support and supporting means from said hot motive gases to maintain said bearing support comparatively cool with respect to said motive gases, the axial length of said tubular support being determined to effect an axial temperature gradient therein sufficient to maintain said pilot flange at approximately the temperature of said shoulder and to distribute the thermal stresses in said tabular support to enable thermal distortion of said inner and outer shroud and nozzles with said blades without disrupting said predetermined spatial relationship and alignment.

6. In the combination according to claim 5, the maximum cross-sectional thickness of said shrouds and nozzles and of said tubular support in the region of its juncture with said inner shroud being of the same order of magnitude, and said annular gas passage having a portion extending upstream of the leading edges of said nozzles, the cross-sectional area of said portion enlarging upstream of said leading edges.

7. In the combination according to claim 6 the radially outer edge of said flange being integral with said other end of said tubular support.

8. In a one-piece cast assembly for directing motive gases to the rotor of a gas turbine engine, coaxial inner and outer annular shrouds defining an annular gas passage, a plurality of flow directing nozzles spaced circumferentially within said passage and integral at their radially inner and outer ends respectively with said inner and outer shrouds to support the same, and supporting means arranged annularly around the axis of said shrouds, said supporting means comprising a tubular support having one end integral with said inner shroud, said tubular support extending axially from said one end and converging to an integral annular pilot means located between said inner shroud and the latter's axis for attachment in piloted relationship to a mating pilot, the inner circumference of the leading portion of said inner shroud being circularly cylindrical to comprise a sleeve pilot, and said supporting means being integrally joined with said inner shroud adjacent the downstream edge of said sleeve pilot and upstream of the mid-point between the axially opposite ends of said inner shroud.

9. In the combination according to claim 8, said support extending axially from said pilot means generally in parallelism with the axis of said shrouds for the major portion of its length, then extending radially outwardly to its juncture with said inner shroud.

10. In the combination according to claim 9, said pilot means comprising a radial pilot flange and its radially outer edge being integrally joined with the axial end of said support opposite said one end.

11. In the combination according to claim 1, said inner and outer shrouds being constructed and arranged with an axial length upstream of said nozzles of sufficient amount that the meridional component of the maximum velocity of said gases at the upstream ends of said shrouds is less than .7 of the meridional component of the maximum velocity of said gases at the upstream edges of said nozzles, whereby the effect of turbulence caused by the entry of said gases into said passage is rendered unobjectionable with respect to the power output of said engine.

12. In a one-piece cast assembly for directing motive gases to the rotor of a gas turbine engine, coaxial inner and outer annular shrouds defining an annular gas passage, a plurality of flow directing nozzles spaced circumferentially within said passage and integral at the radially inner and outer ends respectively with said inner and outer shrouds to support the same, and supporting means arranged annularly around the axis of said shrouds, said supporting means comprising a tubular support having one end integral with said inner shroud, said tubular support extending axially from said one end and converging to an integral annular pilot means located between said inner shroud and the latter's axis for attachment in piloted relationship to a mating pilot, the maximum cross-sectional thickness of said shrouds and nozzles and of said tubular support at the region of the latter's juncture with said inner shroud being of the same order of magnitude, said inner and outer shrouds being constructed and arranged with an axial length upstream of the leading edges of said nozzles greater than the radial spacing between said shrouds at said leading edges and of sufficient amount that the meridional component of the maximum velocity of said gases at the upstream ends of said shrouds is less than .7 of the meridional component of the maximum velocity of said gases at the upstream edges of said nozzles, whereby the effect of turbulence caused by the entry of said gases into said passage is rendered unobjectionable with respect to the power output of said engine.

13. In the combination according to claim 12, said annular gas passage having a portion extending upstream of the leading edges of said nozzles, the cross-sectional area of said portion enlarging upstream of said leading edges.

14. In a gas turbine engine having a first stage bladed rotor, means for directing hot motive gases at approximately sonic velocity to said rotor comprising a gas collecting chamber and a one-piece gas transmitting structure, said gas transmitting structure including inner and outer annular shrouds defining an annular gas passage coaxial with said rotor, said annular passage opening downstream to deliver said gases to said rotor and opening upstream into said collecting chamber to receive said gases therefrom, and gas transmitting structure also including a plurality of circumferentially arranged flow directing nozzles within said passage, said nozzles being formed integrally with said inner and outer shrouds and extending between and spacing said inner and outer shrouds radially at a location spaced axially from said chamber, said inner and outer shrouds defining an aerodynamically smooth contour for said gas passage and a cross section therefor gradually enlarging in the direction upstream of said nozzles to minimize turbulence in said passage, the maximum cross-sectional thickness of each element of said gas transmitting structure being of the same order of magnitude, and means for rendering the effect of turbulence caused by the entry of said gases into said passage unobjectionable with respect to the power output of said engine comprising said inner and outer shrouds arranged and constructed with an axial length between said nozzles and chamber greater than the radial spacing between said shrouds and of sufficient amount that the meridional component of the maximum velocity of said motive gases at the upstream ends of said shrouds is less than .7 of the meridional component of the maximum velocity of said gases at the edges of said nozzles nearest said chamber.

References Cited by the Examiner

UNITED STATES PATENTS

| | | | |
|---|---|---|---|
| 2,494,328 | 1/1950 | Bloomberg. | |
| 2,606,741 | 8/1952 | Howard | 253—39.15 |
| 2,675,672 | 4/1954 | Schorner. | |
| 3,013,771 | 12/1961 | Henny | 253—78 X |
| 3,096,074 | 7/1963 | Pratt et al. | 253—39.15 X |
| 3,151,841 | 10/1964 | Henny | 253—39.1 |
| 3,262,677 | 7/1966 | Bobo et al. | 253—78 |

FOREIGN PATENTS

| | | |
|---|---|---|
| 1,286,534 | 1/1962 | France. |
| 1,326,037 | 3/1963 | France. |
| 501,266 | 2/1939 | Great Britain. |

MARTIN P. SCHWADRON, *Primary Examiner.*

SAMUEL LEVINE, *Examiner.*

E. A. POWELL, *Assistant Examiner.*